United States Patent [19]

Greenwood

[11] Patent Number: 4,567,022
[45] Date of Patent: Jan. 28, 1986

[54] APPARATUS FOR FACILITATING SAMPLING OF PARTICULATE MATTER PASSING FROM ONE TREATMENT ZONE TO ANOTHER

[75] Inventor: Arthur R. Greenwood, Niles, Ill.
[73] Assignee: UOP Inc., Des Plaines, Ill.
[21] Appl. No.: 686,053
[22] Filed: Dec. 24, 1984
[51] Int. Cl.[4] .............................. B01J 38/42
[52] U.S. Cl. .................. 422/144; 73/863.81; 208/140; 422/142; 422/145; 422/191; 422/192; 422/223
[58] Field of Search .............. 422/144, 145, 142, 223, 422/191–193, 213, 216, 218; 208/134, 139, 140; 73/863.81, 863.86

[56] References Cited

U.S. PATENT DOCUMENTS

| | | | |
|---|---|---|---|
| 2,440,525 | 4/1948 | Roetheli | 422/144 X |
| 3,652,231 | 3/1972 | Greenwood et al. | 422/223 |
| 3,692,496 | 9/1972 | Greenwood et al. | 422/191 |
| 3,706,536 | 12/1972 | Greenwood et al. | 422/192 X |
| 3,786,682 | 1/1974 | Winter et al. | 73/863.86 |
| 3,838,039 | 9/1974 | Vesely et al. | 422/223 X |
| 3,882,015 | 5/1975 | Carson | 422/142 X |
| 3,907,511 | 9/1975 | Forbes et al. | 422/191 |
| 3,973,440 | 8/1976 | Vande Ven et al. | 73/863.81 |
| 4,167,474 | 9/1979 | Sikonia | 208/140 |

Primary Examiner—Richard L. Chiesa
Attorney, Agent, or Firm—Thomas K. McBride; William H. Page, II; Barry L. Clark

[57] ABSTRACT

Apparatus for transferring particulate contact material by gravity from an upper contact zone wherein it is contacted by a first gas flowing radially, to a lower zone wherein it is contacted by a second gas flowing upwardly. The apparatus includes a generally annular transition zone which connects the upper and lower zones. The transition zone effectively isolates the second gas from contacting the particulate material in the upper zone. In a preferred embodiment in the form of a catalyst regenerator, catalyst particles can be sampled for carbon level in the transition zone to determine if the carbon burn-off therefrom is sufficiently complete in an upper radial flow regenerator bed by contact with a first gas, having a relatively low oxygen level. The sampling can be done on stream, even though a second gas, such as relatively oxygen-rich halogenation gas, is passing up through the catalyst in the lower zone.

10 Claims, 3 Drawing Figures

U.S. Patent  Jan. 28, 1986  4,567,022
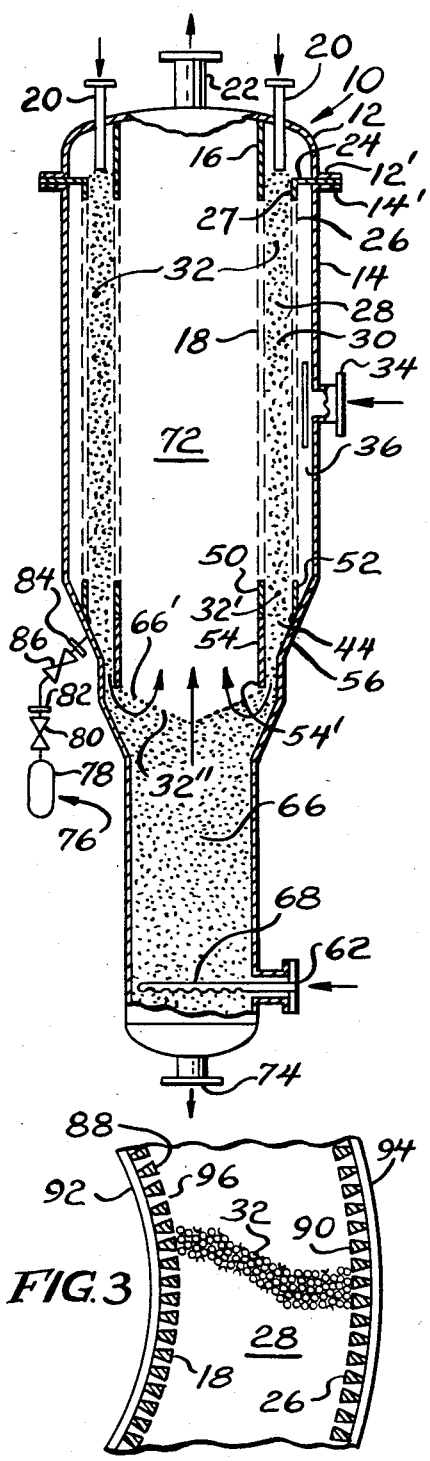
FIG. 1
FIG. 3
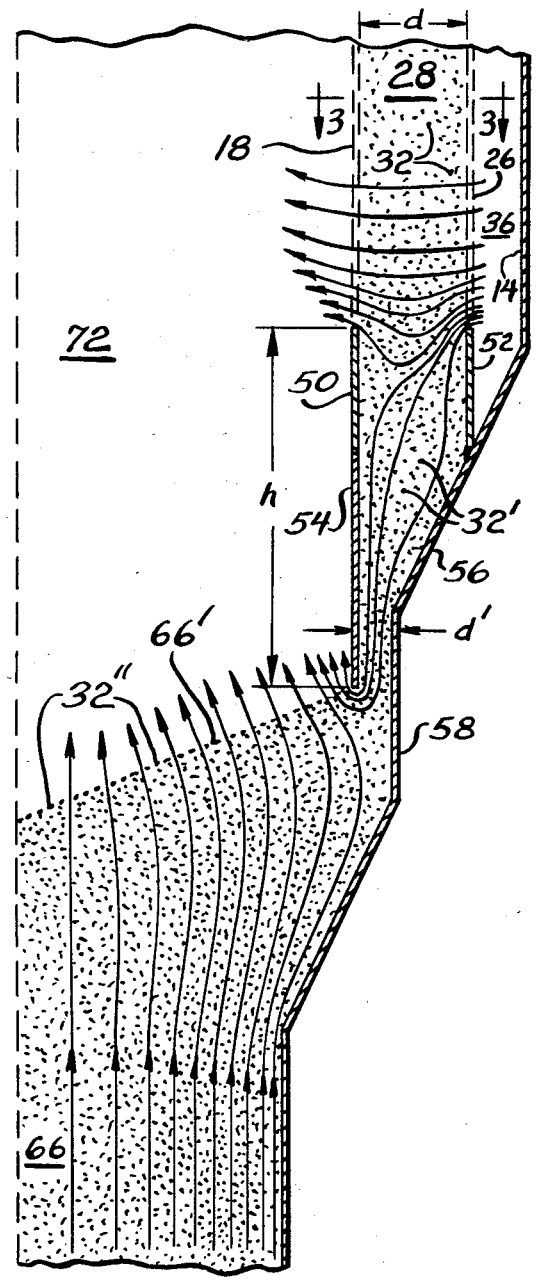
FIG. 2

APPARATUS FOR FACILITATING SAMPLING OF PARTICULATE MATTER PASSING FROM ONE TREATMENT ZONE TO ANOTHER

BACKGROUND OF THE INVENTION

The invention relates to apparatus of the type wherein a gas or vapor is used to react with or treat a particulate type of contact material such as a catalyst, which is passing by gravity from one reaction or treating zone to another. Examples of processes carried out in such an apparatus include various hydroprocessing techniques such as catalytic reforming, catalyst regeneration, hydrotreating, dehydrogenation of butane and dehydrocyclodimerization, to name a few. A specific example of a catalyst regeneration apparatus in which a catalyst whose surface has been covered with coke during a catalytic reforming operation, moves downward through a carbon burn-off section, through a halogenation section and into a drying section is shown and described in Greenwood et al., U.S. Pat. No. 3,652,231, the subject matter of which is herein incorporated by reference. In this particular apparatus, the catalyst moves downwardly in the annular space between a pair of spaced concentric perforated screens and is subjected initially to a first radially flowing recycle flue gas having a relatively low oxygen content and secondly, to a radially flowing second gas containing air, a halogen and steam. The first and second gases are each brought into an annular, elongated plenum space surrounding the annular screens and are segregated within the plenum by an annular baffle ring which divides the plenum into two regions. Obviously, this arrangement permits some of the recycle gas to diffuse downwardly into the catalyst region being subjected to the second gas while permitting some of the second gas to diffuse upwardly into the catalyst region being subjected to the first gas. To the extent there is diffusion, it is difficult, if not impossible, to determine if there is any particular location in the annular space in which the catalyst could be sampled so as to provide a sample which could be said to be truly representative of the catalyst after its coked surface had been burned off to a desired extent. In usual practice, although sampling devices such as those shown in U.S. Pat. Nos. 3,786,682 and 3,973,440 do exist, it is common, when attempting to measure the extent to which coke has been burned off, to operate only the burn-off zone of the regenerator without operating lower zones such as halogenation and drying. Then, after the regenerator has been operated for a sufficient number of hours to permit catalyst to pass through the inoperative halogenation and drying zones and to get to the bottom of the vessel, a sample is taken of the catalyst leaving the vessel. Such a method obviously is very time-consuming and is thus sometimes done only upon startup of operation.

SUMMARY OF THE INVENTION

It is among the objects of the present invention to provide an apparatus for transferring a column of particulate contact material by gravity from one upper treatment zone where it is contacted by a first gas to another lower treatment zone where it is contacted by a second gas in such a way that a region will be defined in which the contact material can be sampled while it is truly representative of the condition of the material after complete treatment in the upper zone.

Another object is to provide a transfer apparatus which assists the gravitational movement of particulate contact materials between an upper treatment zone and a lower treatment zone.

Yet another object is to provide a transfer apparatus which permits the free gravitational movement of particulate contact materials from an upper gas treatment zone to a lower one while preventing upward movement of a gas in the lower zone into the upper zone.

The foregoing and other objects and advantages are achieved by the apparatus of the present invention. In a preferred embodiment, a particulate contact material, such as spherical particles of a catalyst, may be transferred in a generally continuous manner from one treatment zone to another. In a specific application wherein the apparatus of the invention comprises the burn-off and chlorination zones of a catalyst regenerator, the catalyst particles are transferred to the apparatus from a reactor where, during the course of reacting with a hydrocarbon stream, they have become at least partially coated with coke. The transfer of particles to the upper treatment zone of the instant apparatus may be by means of a lift engager, or other suitable transfer means, which forms no part of the present invention. Similarly, the particular apparatus used to transfer the particles from the lower treatment zone of the instant apparatus to other treatment zones and/or back to the reactor, forms no part of the present invention.

The first or upper treatment zone of the instant apparatus includes a pair of vertically elongated, radially spaced perforated members, such as screens which have been made by helically wrapping and welding wedge-shaped wires around a plurality of support rods. Preferably, as discussed in U.S. Pat. No. 3,652,231, the screen is cut and rerolled at a 90° angle to its original position to cause the wires to run parallel to the vertical flow path of the catalyst particles. Such a positioning minimizes attrition of the bed of catalyst particles moving downwardly in the annular space between the members, and also reduces the chance that the pressure of the radially flowing treatment gas will cause any particles to get pinned in the vertical flow slots defined by the wires where they could possibly produce an increase in back pressure and where they could possibly cause a maldistribution of the gases. The apparatus includes an annular plenum space or region around the aforementioned pair of spaced screens into which a first treatment gas, such as recycle flue gas into which a controlled quantity of air has been added, is introduced. The air addition is controlled so that the recycle flue gas will have a relatively low oxygen content, such as 0.8%. By providing a relatively lengthy residence time of the catalyst particles with the gas and by providing constant recirculation of large volumes of the gas through the screens and catalyst particles, the coke on the particles will be gradually burned off so as to reduce the weight percent of carbon on the particles from about 5% to about 0.2%. The treatment gas, together with the products of combustion, will pass into a central vapor collection zone located radially inwardly of the screens.

It is essential that the oxygen content be kept quite low in the upper zone since more oxygen would provide a faster carbon burn-off and produce a higher temperature in the catalyst bed. It is well known that elevated temperatures can cause destruction, or at least a reduction in the anticipated life of catalyst particles. However, as hereinafter discussed, it is also essential that enough oxygen be provided that sufficient coke will be burned off in the upper zone that not enough is left on the particles so as to cause them to overheat and be destroyed when they contact the higher oxygen content gas in the lower zone.

The apparatus further includes a lower cylindrical zone. The catalyst particles contained in this zone move downwardly through the zone by gravity as material is withdrawn from the bottom of the zone. A transition zone, to be hereinafter described, joins the upper and lower zones and uniformly distributes catalyst from the upper zone to the lower zone. In the radial flow upper zone, large volumes of the first gas, a recycle flue gas to which a small quantity of oxygen has been added in the form of air, must typically be recycled continuously by a blower to gradually burn off the coked surface on the catalyst. However, in the lower cylindrical zone, no substantial gas flow rates are required since it has been found that the catalyst particles can be reconditioned by merely being soaked in the second gas. The second gas is relatively rich in oxygen compared to the first gas and is preferably air to which a chlorination agent such as $Cl_2$, HCl or an organic chloride has been added. The second gas is caused to flow slowly upwardly through the lower bed and into the central vapor collection zone. The vapor collection zone is defined on its bottom by the upper surface of the catalyst particles in the lower zone and on its sides, at its lower end portion, by the radially inner surface of the inner wall of the transition zone and, at its upper end portion, by the inner perforated wall of the annular upper zone. During the soaking period in the second gas, catalyst particles, at least in the situation wherein the catalyst is Pt, have the Pt reconditioned by being redistributed uniformly over the pore surfaces of the substrate. This operation is desirable since the Pt catalyst tends to become unevenly distributed as the coke is burned off the catalyst particles in the upper zone.

The aforementioned transition zone comprises a pair of inner and outer unperforated wall members which define a vertically elongated, generally annular flow channel through which the catalyst particles leaving the annular upper zone can flow substantially uniformly into the annular outer edge portions of the generally cylindrical lower zone.

In the preferred embodiment, the walls of the transition zone are spaced apart more at the top than the bottom so that they constitute downward extensions of the cylindrical screens which define the upper zone. The inner wall of the transition zone is preferably straight for its entire length so as to present a smooth flow surface for the particles. The outer wall can also extend straight downwardly so as to provide a transition zone of constant cross-section. However, it is preferred that the outer wall be generally inwardly tapered in an intermediate region between its upper and lower ends. Thus, the transition zone will have a considerably less area in annular cross-section at its bottom than at its top. Because of the progressive reduction in the radial width of the transition zone, the volume of catalyst particles which it contains may be considerably reduced as compared to having a zone of the same height and parallel walls which extend down from the screen cylinders. More importantly, the reduction in cross-section will provide a reduction in gas flow as compared to a transition zone of the same height with parallel sides. The tapered wall also provides a good mounting location for a sampling structure.

The vertical dimension of the transition zone should be at least equal to, and preferably greater than, the distance between the screen cylinders. This dimensioning will assure that the pressure drop between the upper and lower zones will not be less than the radial pressure drop across the upper zone. By maintaining the aforementioned dimensional relationship, the major portion of the first gas will pass radially inwardly through the upper zone screens and into the central collection zone. Also, the ascending gas in the lower zone will pass vertically into the central collection zone which is of course at a pressure lower than the pressure of the first and second gases as they enter their associated zones. The second gas will not enter the transition zone since it would encounter the considerable back pressure of the catalyst bed therein as well as a small downward flow of the first gas. Rather, it will naturally pass, because of the absence of any back pressure, into the central collection zone. There is an absence of back pressure since the top layer of catalyst particles in the lower zone defines the bottom of the collection zone.

The height and/or radial width of the transition zone is preferably selected to be of such an extent that a pressure drop will be attained through the catalyst particles in the zone which will be high enough that it will prevent a downward flow of the first gas through the zone which would be sufficient to cause fluidization of the catalyst particles at the juncture of the transition zone and the lower zone. If fluidization could take place, the particles could attrite rapidly. Conversely, the transition zone height should be short enough that at least some relatively small amount of the first gas will continue to flow downwardly. The downward flow of the first gas assists the gravitational flow of catalyst particles through the transition zone. In a particular design of an apparatus a transition height equal to about three times the distance between the screens in the first zone appeared to be quite satisfactory.

From the description supra, it will be readily apparent that the catalyst particles in the transition zone are quite uniformly representative of the degree to which coke has been burned off. Thus, if the catalyst particles in the transition zone could be sampled, the sampled particles would accurately indicate the treatment level achieved in the burn-off zone. Since the sampling could be done continuously, or at least periodically, it would enable one to better control the regeneration process and minimize possible damage to the catalyst particles by overheating. For example, if sampling determines that not enough coke is being burned off, the oxygen content of the first gas could be increased. Similarly, if the burn-off was found to be sufficiently complete, the oxygen content of the burn-off gas could possibly be reduced. The ability to accurately determine the degree of burn-off is of particularly great importance when one considers that catalyst particles which might be allowed to enter the high oxygen content lower zone with a substantial amount of coke still on their surfaces could possibly react so quickly with the oxygen that they would be heated instantly to temperatures upwards of 2000° F. Such high temperatures could fuse the particles together and destroy them while somewhat lower, but still elevated, temperatures could greatly shorten their useful life. Ideally, the oxygen level in the first gas should be just sufficient to cause the catalyst particles leaving the upper burn-off zone to be sufficiently free of coke that they will not experience a damaging increase in temperature when reaching the oxygen-rich lower zone. This minimized oxygen level in the upper zone will also assure that the catalyst particles are subjected to a minimal temperature in the upper zone. Thus, the useful life of the catalyst particles can be maximized. Previously, it has been necessary to try and provide at least slightly more oxygen in the upper zone than absolutely necessary in order to be assured of a desired degree of coke burn-off. However, any excess oxygen obviously increases catalyst temperature and thus shortens the catalyst life. The ability to achieve even a small decrease in catalyst temperature, especially in the upper zone where the catalyst might reside for an hour or more, is of substantial importance since temperature is so critical to the life of a catalyst. In the present apparatus, the low oxygen content gas in the upper zone cannot burn off all of the coke on the catalyst particles since some will remain at the center of the particle. This remainder, which might cause the total carbon content to be about 0.2% when leaving the upper zone, will be quickly burned off when the particles first enter the lower zone and are contacted by the high oxygen content gas therein. This burning will naturally cause the particles to be heated but, assuming the particles had their coke reduced to the desired level, will not produce temperatures any higher than those reached at the upper portion of the upper burn-off zone, and the temperature will soon fall to the level of the remainder of the lower zone. Also, since so little coke is present and since it takes a significant amount of time for the oxygen to diffuse into the center of the particles where the remaining coke resides, the slight short term increase in temperature will be of no substantial consequence.

BRIEF DESCRIPTION OF THE DRAWING

FIG. 1 is a partially sectioned, elevational view of a preferred form of catalyst reconditioning or regenerating apparatus in which a descending catalyst moves sequentially between an annular upper zone, an annular transition zone where it may be sampled, and a lower generally cylindrical zone;

FIG. 2 is an enlarged sectional view of a portion of the apparatus of FIG. 1 which illustrates the transition zone and its attachment to the upper and lower zones; and FIG. 3 is a cross-sectional view taken on line 3—3 of FIG. 2.

DETAILED DESCRIPTION OF THE DRAWINGS

Referring to FIG. 1, a preferred embodiment of the apparatus of the present invention comprising a two-stage regenerator section, can be seen to include a vertical pressure vessel indicated generally at 10. A removable head section 12 is joined by fastener means, not shown, to the cylindrical outer wall 14 of the vessel. An unperforated end ring member 16 is welded at its upper end to the head section 12 and at its lower end to the upper end of a perforated inner screen cylinder 18. A plurality of catalyst inlet conduits 20 adapted to receive used catalyst from a reactor or other source, are mounted to, and pass through the head section 12. A gas outlet fitting 22 is also mounted to the head section to remove gases from inside the vessel. A radially extending screen support flange 24 is mounted between flanges 12', 14' on the head section 12 and wall 14 and serves to mount a perforated, outer screen cylinder 26 having an upper end mounting ring portion 27 which depends downwardly. The annular space between the inner and outer perforated screen portions 18, 26 defines an upper gas treatment zone 28 which contains a column 30 of used catalyst particles 32 having coke deposits thereon. Typically, the coke will be of such an extent as to cause carbon to amount to about 5 weight percent of the catalyst particles. The zone 28 may also be referred to as a "carbon burn-off" zone since, typically, the coke is substantially removed or burned off as the particles 32 are continually contacted by a stream of a first treatment gas which enters the zone 28 through the gas-vapor inlet means 34 and an annular distribution section 36 between wall 14 and screen 26. The first gas is preferably a recycle flue gas such as the gas exiting through outlet 22, to which a sufficient quantity of air has been added to give it a relatively low oxygen content, such as about 0.8%, for example. The low oxygen content holds down the rate of carbon burn-off and thus controls the maximum temperature to which the catalyst particles are subjected, thereby protecting them from being overheated. As previously discussed, the ability of the apparatus to permit accurate sampling, can permit adjustments to be made in the oxygen level to minimize temperatures and increase catalyst life.

Immediately below the upper "burn-off" zone 28 is a transition zone 44 defined at its upper end by an inner, unperforated cylindrical end ring member 50 which is welded to the bottom end of the inner perforated screen cylinder 18, and a similar end ring member 52 which is welded to the outer perforated screen cylinder 26. The lower end of the transition zone 44 is defined on its inner surface by a cylindrical inner wall portion 54 of a transition element which is welded to the ring member 50. Alternatively, the ring 50 could be longer so as to eliminate the need for element 54.

As seen most clearly in FIG. 2, the transition zone is shown as having a generally downwardly tapered cross-section since its outer wall is defined by an angled cone portion 56 and a vertical portion 58. Thus, at its top, the transition zone has a width equal to the width d of the radial space between the screens 18, 26, while at its bottom, it has a width d' which is preferably less than one-half of d. Although the transition zone 44 could also have parallel side walls, and a constant width annular cross-section, the generally tapered design shown will, for a given height h of the transition zone, cause a decrease in the amount of the first gas which can pass downwardly through the transition zone as compared to a zone of constant width d. This flow decrease is caused by the increase in back pressure produced by the particles 32 in the catalyst bed when they must pass through a restricted opening. The provision of a tapered cross-section for the transition zone 44 also causes an increase in velocity of the particles in the column 30 as they pass downwardly through the transition zone. The downward movement of the particles is assisted by the fact that a small portion of the gas in the upper gas treatment section 36 will flow downwardly, as indicated by the streamlines in FIG. 2.

It will be readily obvious that the particles 32', which have completed their downward journey through the upper treatment zone 28 and passed into transition zone 44, will be truly representative of the degree of coke burn-off achieved in zone 28. This condition will exist since there is virtually no chance for the particles 32' therein to be contacted by the relatively oxygen-rich gas which enters gas inlet 62 and is distributed upwardly through the lower, cylindrical treatment zone 66 by a distribution means, such as a flow distributor 68.

The gas flowing upwardly through the lower zone 66 will tend to flow directly into the central collection zone 72 wherein it will mix with the gases flowing radially inwardly through the upper treatment zone 28 and exit the apparatus through gas outlet 22. The central collection zone 72 will be at a pressure lower than the pressure of the gases entering inlets 34 and 62. Since the top surface 66' of the lower treatment zone 66 is defined only by the catalyst particles 32" which flow by gravity around the lower edge 54' of the inner wall 54 of the transition element, there would be no tendency for the upwardly flowing gas to flow into the transition zone 44. The flow cannot take place since the particles 32' in the transition zone would introduce a back pressure on the gas. Also, the small amount of downwardly flowing gas in the transition zone would be at a higher pressure than the pressure in the central collection zone 72.

The flow rate of the column 30 through the zone 28 and the zone 66 will be determined by the rate at which particles 32" leave the zone 66 through outlet 74. The particles leaving zone 66 can go on for additional treatment if desired, such as a drying operation, which forms no part of the present invention.

In order to sample the particles 32' in the transition zone 44, a sampling apparatus indicated generally at 76 can be utilized. The particular type of sampling apparatus used forms no part of the present invention but could comprise a sample bomb 78 having a valve 80 and joined by flange means 82 to an outlet port 84 having a flow control valve 86.

FIG. 3 is an enlarged sectional view taken on line 3—3 of FIG. 2 and merely illustrates the shape of the annular treatment zone 28, and the fact that the wedge-shaped wires 88, 90 which are welded to rods 92, 94 to form the screens 18, 26, respectively, have slots 96 which are of less dimension than the diameter of the catalyst particles 32.

The preceding description of the adaptation of the invention to a catalyst regenerator is merely representative of one application thereof and is not intended to limit the scope of the invention, which is defined by the claims hereinbelow.

I claim as my invention:

1. An apparatus for transferring or distributing particles of downwardly moving contact material from an upper annular zone, in which they are adapted to be contacted by a first gas flowing radially inwardly through them, to a lower zone in which they are adapted to be contacted by a second gas, characterized in that said upper annular zone is defined by axially elongated portions of a pair of coaxial, radially spaced screen elements, said elongated portions being formed so as to contain a plurality of gas flow openings of less width than the dimensions of the contact material in said annular zone, said lower zone being of generally cylindrical shape and having a vertically elongated, imperforate, external wall portion which radially confines the contact material within said lower zone, said external wall portion being joined to the radially outer one of said pair of screen elements by the outer wall of a generally annular transition element, said generally annular transition element including an outer wall portion joined to the external wall portion of said lower zone and to the outer screen element and a generally cylindrical, imperforate inner wall portion which is joined to the radially inner one of said pair of screen elements, the bottom end of said inner wall portion defining the upper height limit which contact material can reach within the lower zone after having passed downwardly through said annular transition element and into said lower, generally cylindrical zone, said lower, generally cylindrical zone being coaxial with, and in direct and open communication with, a generally cylindrical vapor collection zone positioned above it which has its side wall defined at its lower portion by said inner wall portion of said annular transition element, means for introducing a first gas at a selected pressure into an upper portion of said apparatus at at least one location adjacent said upper annular zone, means for introducing a second gas at a selected pressure into a lower portion of said apparatus so that it may flow upwardly through said lower, generally cylindrical zone, said first and second gases each being adapted to flow first through a bed of contact particles in its respective zone and then into said vapor collection zone, said vapor collection zone being maintained at a pressure less than the selected pressure of either of said first and second gases whereby said second gas will pass directly out of the top of said lower, generally cylindrical zone and into said vapor collection zone, the inner wall portion of said generally annular transition element cooperating with an unperforated lower end portion of said radially inner screen element to which it is joined so as to define the vertical height of a transition zone between the upper and lower zones, said transition zone having a vertical height which is no less than the radial distance between the screen elements and which is sufficient to contain enough particles of contact material to generate a back pressure which will prevent said second gas from entering said transition zone.

2. An apparatus in accordance with claim 1 wherein said transition zone has a vertical height of at least twice the radial distance between the screen elements.

3. An apparatus in accordance with claim 1 wherein said transition zone has a vertical height of at least three times the radial distance between the screen elements.

4. An apparatus in accordance with claim 1 wherein said transition zone has a vertical height which is sufficient to limit the downward flow of the first gas through the transition zone to a velocity which is insufficient to fluidize any of the particles in the apparatus.

5. An apparatus in accordance with claim 1 wherein said contact material comprises porous catalyst particles.

6. An apparatus in accordance with claim 1 wherein a sampling port is attached to said transition element at a location intermediate said upper and lower zones, said sampling port permitting sampling of the contact material particles in said transition zone after they have been completely reacted with the first gas in the upper zone but before they have reacted with the second gas in the lower zone.

7. An apparatus in accordance with claim 1 wherein said transition element is shaped so that its walls are closer together at its bottom than at its top.

8. An apparatus in accordance with claim 7 wherein the walls of said transition element at its bottom are at a radial spacing from each other which is less than 50% of the radial distance between the screen elements.

9. A regenerator apparatus for transferring or distributing cokecoated particles of downwardly moving catalyst material having a carbon content of at least 2% from an upper annular burn-off zone, in which they are adapted to be contacted by a first gas having a relatively low oxygen content of about 0.8% which reduces their carbon content to at least 0.2% as it continues to flow radially inwardly through them, to a lower zone in which they are adapted to be contacted by a second gas having a relatively high oxygen content, such as substantially air, characterized in that said upper annular zone is defined by axially elongated portions of a pair of coaxial, radially spaced screen elements, said elongated portions being formed so as to contain a plurality of gas flow openings of less width than the dimensions of the catalyst material in said annular zone, said lower zone being of generally cylindrical shape and having a vertically elongated, imperforate, external wall portion which radially confines the catalyst material within said lower zone, said external wall portion being joined to the radially outer one of said pair of screen elements by the outer wall of a generally annular transition element, said generally annular transition element including an outer wall portion joined to the external wall portion of said lower zone and to the outer screen element and a generally cylindrical, imperforate inner wall portion which is joined to the radially inner one of said pair of screen elements, the bottom end of said inner wall portion defining the upper height limit which catalyst material can reach within the lower zone after having passed downwardly through said annular transition element and into said lower, generally cylindrical zone, said lower, generally cylindrical zone being coaxial with, and in direct and open communication with, a generally cylindrical vapor collection zone positioned above it which has its side wall defined at its lower portion by said inner wall portion of said annular transition element, means for introducing said first gas at a selected pressure into an upper portion of said apparatus at at least one location adjacent said upper annular zone, means for introducing said second gas at a selected pressure into said lower portion of said apparatus so that it may flow upwardly through said lower, generally cylindrical zone, said first and second gases each being adapted to flow first through a bed of catalyst particles in its respective zone and then into said vapor collection zone, said vapor collection zone being maintained at a pressure less than the selected pressure of either of said first and second gases whereby said second gas will pass directly out of the top of said lower, generally cylindrical zone and into said vapor collection zone, the inner wall portion of said generally annular transition element cooperating with an unperforated lower end portion of said radially inner screen element to which it is joined so as to define the vertical height of a transition zone between the upper and lower zones, said transition zone having a vertical height which is no less than the radial distance between the screen elements and which is sufficient to contain enough particles of catalyst material to generate a back pressure which will prevent said second gas from entering said transition zone.

10. An apparatus in accordance with claim 9 wherein a sampling port is attached to said transition element at a location intermediate said upper and lower zones, said sampling port permitting sampling of the catalyst particles in said transition zone after they have been completely reacted with the first gas in the upper zone but before they have reacted with the second gas in the lower zone.

* * * * *